(12) United States Patent
Uemura et al.

(10) Patent No.: US 8,380,022 B2
(45) Date of Patent: Feb. 19, 2013

(54) MOUNTING STRUCTURE

(75) Inventors: Hiroshi Uemura, Yokohama (JP);
Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 307 days.

(21) Appl. No.: 12/692,889

(22) Filed: Jan. 25, 2010

(65) Prior Publication Data

US 2011/0097034 A1 Apr. 28, 2011

(30) Foreign Application Priority Data

Oct. 27, 2009 (JP) ................................ 2009-246775

(51) Int. Cl.
  *G02B 6/12* (2006.01)
(52) U.S. Cl. ........................................ 385/14
(58) Field of Classification Search ...................... 385/14
  See application file for complete search history.

(56) References Cited

U.S. PATENT DOCUMENTS

| | | | |
|---|---|---|---|
| 6,985,659 B2 * | 1/2006 | Torigoe et al. | 385/114 |
| 7,523,547 B2 * | 4/2009 | Dangel et al. | 29/842 |
| 7,717,628 B2 * | 5/2010 | Hwang et al. | 385/88 |
| 7,916,984 B2 * | 3/2011 | Kim et al. | 385/14 |
| 2004/0218848 A1 * | 11/2004 | Shen et al. | 385/14 |
| 2005/0180679 A1 * | 8/2005 | Shimizu et al. | 385/14 |
| 2006/0067608 A1 * | 3/2006 | Kobayashi et al. | 385/14 |
| 2006/0269288 A1 * | 11/2006 | Guidotti et al. | 398/135 |
| 2008/0285910 A1 * | 11/2008 | Yamada et al. | 385/14 |
| 2009/0041408 A1 * | 2/2009 | Kondo et al. | 385/14 |
| 2009/0067779 A1 * | 3/2009 | Furuyama | 385/14 |
| 2009/0129786 A1 * | 5/2009 | Deane | 398/164 |

FOREIGN PATENT DOCUMENTS

| | | |
|---|---|---|
| JP | 2006-210809 | 8/2006 |
| JP | 2011-029504 | 2/2011 |

* cited by examiner

*Primary Examiner* — Charlie Peng
(74) *Attorney, Agent, or Firm* — Turocy & Watson, LLP

(57) ABSTRACT

A mounting structure includes an optoelectronic interconnection module that includes electrical interconnection lines, optical interconnection lines, optical semiconductor device and electrical connection terminals, a mounting board that includes electrical interconnection lines and electrical connection terminals on a main surface and on which the optoelectronic interconnection module is mounted, and a connection member that electrically connects, adheres and fixes the electrical connection terminals and the electrical connection terminals. The optoelectronic interconnection module comprises a circuit area on which the optical semiconductor device is mounted and electrical connection terminals are formed and an interconnection area that is formed in a region other than the circuit area and in which the optical interconnection lines and electrical interconnection lines are formed, and the electrical connection terminals are formed on the interconnection area side rather than the optical semiconductor device.

19 Claims, 13 Drawing Sheets

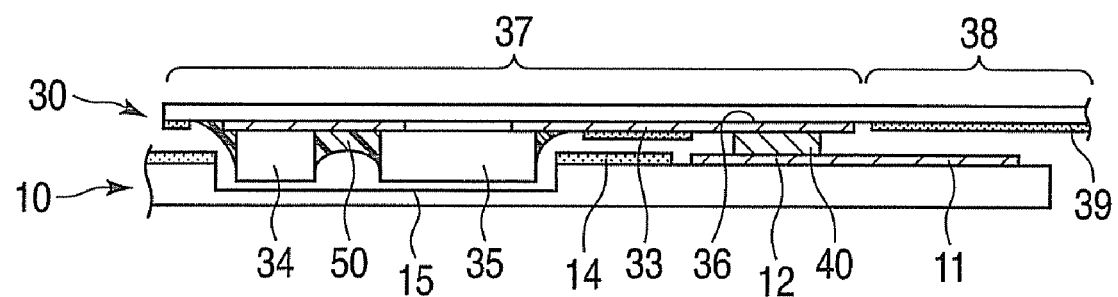
F I G. 13A
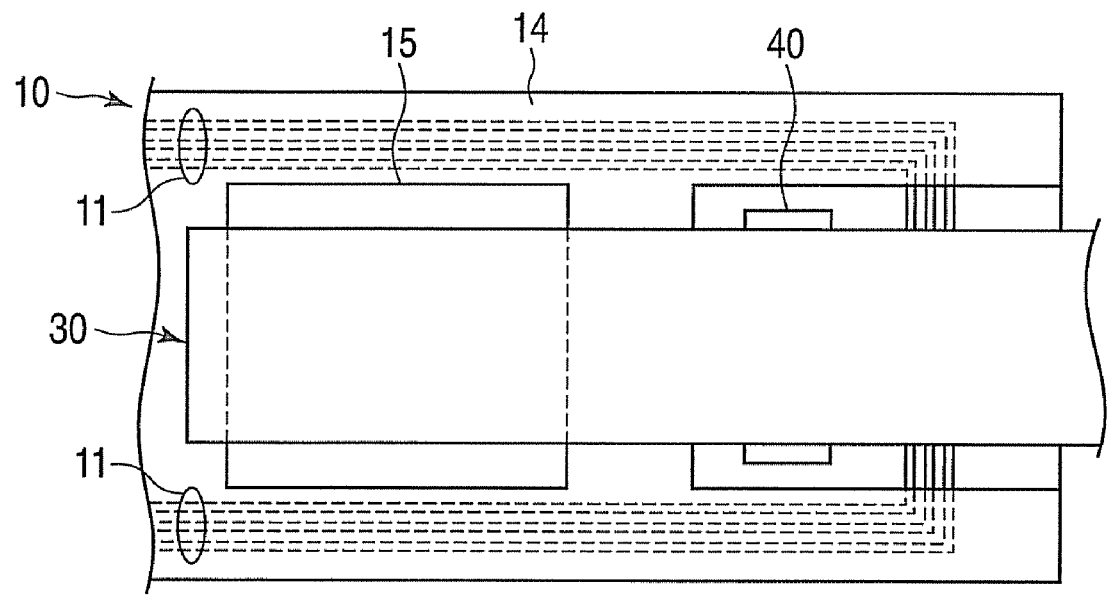
F I G. 13B

MOUNTING STRUCTURE

CROSS-REFERENCE TO RELATED APPLICATIONS

This application is based upon and claims the benefit of priority from prior Japanese Patent Application No. 2009-246775, filed Oct. 27, 2009, the entire contents of which are incorporated herein by reference.

BACKGROUND

Recently, it is more strongly required to enhance the operation speed and reduce noise for signal transmission between LSI chips in mobile communication devices such as personal computers or mobile phones. In accordance with such circumstances, much attention is paid to optoelectronic interconnection attained by combining optical interconnection and electrical wires and having a feature of low noise.

As the optoelectronic interconnection, an optoelectronic interconnection array configured by bundling optical fibers and electrical wires, a flexible optoelectronic interconnection board configured by forming an optical waveguide on a flexible electrical interconnection board (Flexible Printed Circuit: FPC) or the like is provided. An optoelectronic interconnection module having electronic parts such as optical semiconductor devices and driver ICs mounted on a flexible optoelectronic interconnection board is advantageous in view of the cost and performance thereof. The technique described in JP-A 2006-210809 (KOKAI) is known as a mounting structure in which an electrical interconnection module having electronic parts mounted thereon is mounted on a mounting board having a display panel or LSI mounted thereon.

SUMMARY

According to one aspect of this invention, there is provided a mounting structure comprising: an optoelectronic interconnection module mounted on a mounting board and comprising a flexible optoelectronic interconnection board having flexibility, electrical interconnection lines formed on a main surface of the flexible optoelectronic interconnection board, optical interconnection lines formed on the flexible optoelectronic interconnection board, an optical semiconductor device mounted on the main surface of the flexible optoelectronic interconnection board and optically coupled with the optical interconnection lines, and first electrical connection terminals that are formed on the main surface of the flexible optoelectronic interconnection board to electrically connect the electrical interconnection lines to the exterior; the optoelectronic interconnection module including a circuit area that comprises a region on which the optical semiconductor device is mounted and a region in which the first electrical connection terminals are formed, and an interconnection area that comprises a region which is a area other than the circuit area and in which the optical interconnection lines and electrical interconnection lines are formed; the first electrical connection terminals being formed on the interconnection area side rather than the optical semiconductor device, a mounting board comprising electrical interconnection lines and electrical connection terminals that electrically connect the electrical interconnection lines to the exterior on a main surface, the optoelectronic interconnection module being mounted thereon with the main surface of the flexible optoelectronic interconnection board set to face the main surface thereof, and a conductive connection member provided between the first electrical connection terminals of the optoelectronic interconnection module and the electrical connection terminals of the mounting board to electrically connect, adhere and fix the respective electrical connection terminals.

According to another aspect of this invention, there is provided a mounting structure comprising: an optoelectronic interconnection module mounted on a mounting board and comprising a flexible optoelectronic interconnection board having flexibility, electrical interconnection lines formed on a main surface of the flexible optoelectronic interconnection board, optical interconnection lines formed on the flexible optoelectronic interconnection board, an optical semiconductor device mounted on the main surface of the flexible optoelectronic interconnection board and optically coupled with the optical interconnection lines, a driver IC that is mounted on the main surface of the flexible optoelectronic interconnection board and drivers the optical semiconductor device, and first electrical connection terminals that are formed on the main surface of the flexible optoelectronic interconnection board to electrically connect the electrical interconnection lines to the exterior; the optoelectronic interconnection module including a circuit area that comprises a region on which the optical semiconductor device and driver IC are mounted and a region in which the first electrical connection terminals are formed, and an interconnection area that comprises a region which is a area other than the circuit area and in which the optical interconnection lines and electrical interconnection lines are formed; the first electrical connection terminals being formed on the interconnection area side rather than the optical semiconductor device and driver IC, a mounting board comprising electrical interconnection lines and electrical connection terminals that electrically connect the electrical interconnection lines to the exterior on a main surface, the optoelectronic interconnection module being mounted thereon with the main surface of the flexible optoelectronic interconnection board set to face the main surface thereof, and a conductive connection member provided between the first electrical connection terminals of the optoelectronic interconnection module and the electrical connection terminals of the mounting board to electrically connect, adhere and fix the respective electrical connection terminals.

BRIEF DESCRIPTION OF THE DRAWING

FIGS. 13A, 13B are a cross-sectional view and plan view showing the configuration of the main portion of a mounting structure according to a fifth embodiment.

DETAILED DESCRIPTION

Comparison Example

First, the comparison between this invention and the prior art technique is simply explained in order to characterize a difference between this invention and the prior art technique.

In the mounting structure disclosed in JP-A 2006-210809 (KOKAI), a structure is obtained by mounting a flexible electrical interconnection board having ICs as electronic parts mounted thereon on a mounting board with electrical connection terminals disposed therebetween. A region of the flexible electrical interconnection board on which the IC is mounted is not fixed on an external portion (for example, a mounting board).

If this type of flexible electrical interconnection board is used for internal wiring of a movable part (for example, a hinge unit of a mobile phone), a portion of the flexible electrical interconnection board having the IC mounted thereon will also be moved by movement of the movable part. Therefore, there occurs a possibility that the IC will be brought into contact with the external structure and damaged, or a portion of the flexible electrical interconnection board on which the IC is mounted will be bent and the electrical connection between the IC and the flexible electrical interconnection board will be broken. Further, even if the flexible electrical interconnection board is not used for the movable part, there occurs a possibility that the IC may be brought into contact with the external structure and damaged and the electrical connection between the IC and the flexible electrical interconnection board may be broken in a product assembling step (for example, in a step of fixing the mounting structure on an external casing).

That is, in the mounting structure described in JP-A 2006-210809 (KOKAI), since the region on which the IC is mounted is not fixed on an external portion or protected, the reliability of the IC may be degraded.

According to an embodiment of the invention, a load structurally imposed on electronic parts of an optoelectronic interconnection module can be alleviated and the reliability can be enhanced by variously devising the positions of electrical connection terminals of the optoelectronic interconnection module mounted on a mounting board as will be described later.

Now, embodiments of this invention are explained in detail with reference to the accompanying drawings.

First Embodiment

Figure 1:
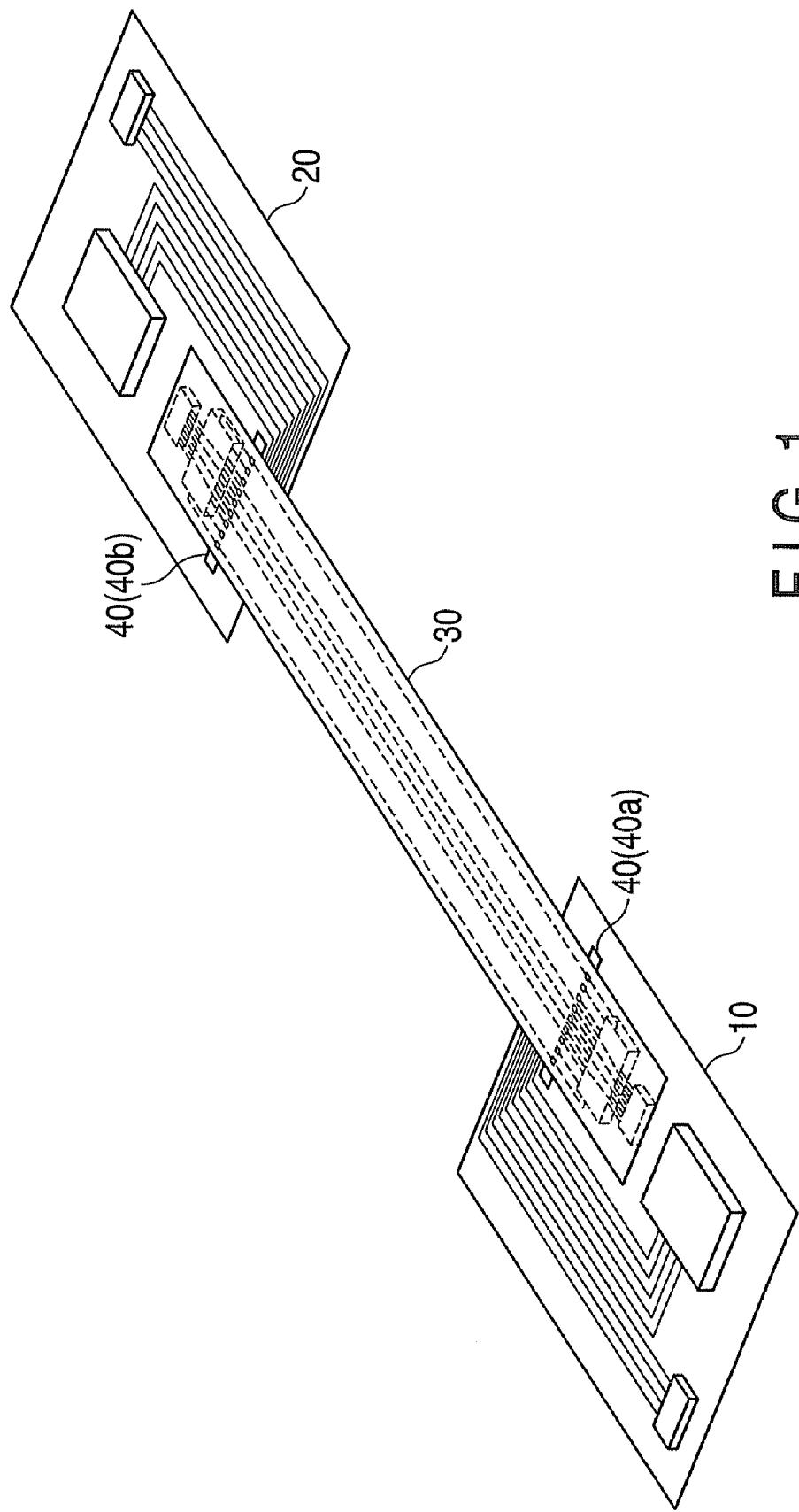
FIG. 1 is a perspective view showing the schematic configuration of a mounting structure according to a first embodiment.

FIG. 1 is a perspective view showing the schematic configuration of a mounting structure according to a first embodiment.

An optoelectronic interconnection module 30 comprising a driver IC, optical semiconductor devices, optical interconnection lines, electrical interconnection lines, electrical connection terminals and the like is provided between a first mounting board 10 comprising an LSI, electrical interconnection lines, electrical connection terminals and the like and a second mounting board 20 comprising an LSI, electrical interconnection lines, electrical connection terminals and the like. The optoelectronic interconnection module 30 is adhered to and fixed on the first and second mounting boards 10, 20 by means of conductive connection members 40 (40a, 40b) that electrically connect the respective electrical connection terminals thereof.

Figure 2:
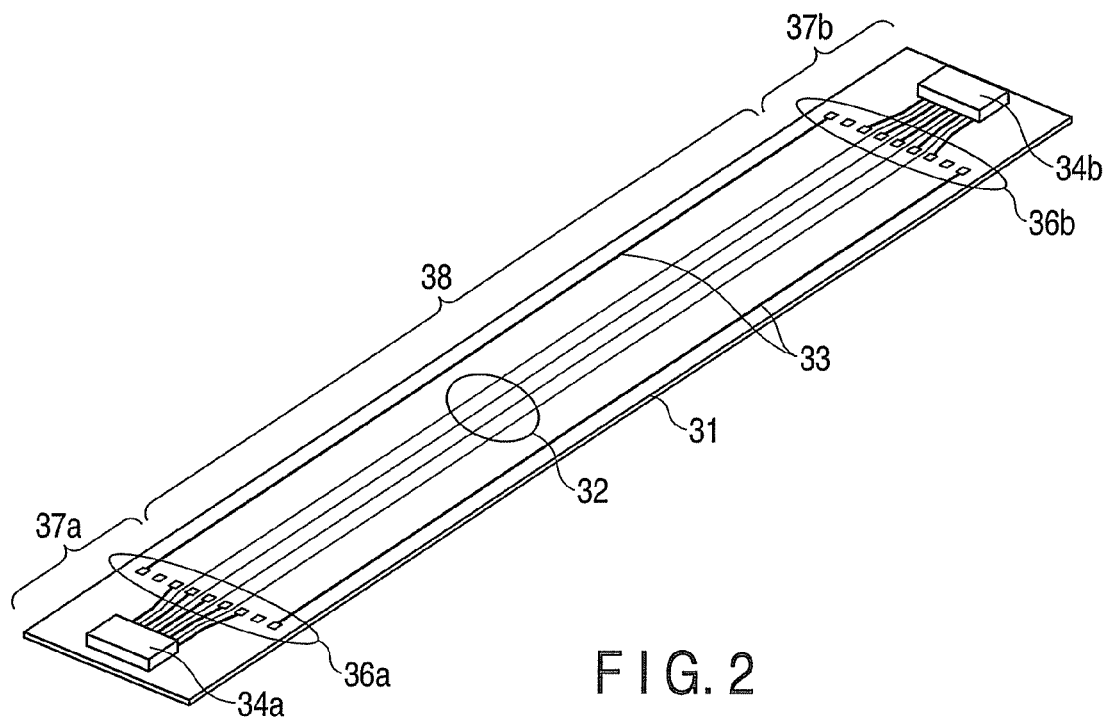
FIG. 2 is a perspective view showing a configuration example of an optoelectronic interconnection module used in the first embodiment.

As shown in FIG. 2, the optoelectronic interconnection module 30 comprises a flexible optoelectronic interconnection board 31, optical interconnection lines 32, electrical interconnection lines 33, optical semiconductor devices 34 (light-emitting device 34a and light-receiving device 34b) and first electrical connection terminals 36 (36a, 36b). The electrical interconnection lines 33, optical semiconductor devices 34 and first electrical connection terminals 36 are provided on the main surface of the flexible optoelectronic interconnection board 31.

The optoelectronic interconnection module 30 further comprises a first circuit area 37a comprising a region on which the light-emitting device 34a is mounted and a region on which the first electrical connection terminals 36a are formed, a second circuit area 37b comprising a region on which the light-receiving device 34b is mounted and a region on which the first electrical connection terminals 36b are formed, and an interconnection area 38 comprising a region that does not contain the circuit areas 37 (37a, 37b) and on which the optical interconnection lines 32 and electrical interconnection lines 33 are formed.

For example, the flexible optoelectronic interconnection board 31 has flexibility like a flexible printed board. The light-emitting device 34a such as a light-emitting diode or semiconductor laser is mounted on the main surface of the flexible optoelectronic interconnection board 31 near one-end portion thereof and the light-receiving device 34b such as a photodiode is mounted on the main surface near the other end portion thereof. The optical interconnection lines 32 are arranged between the light-emitting device 34a and the light-receiving device 34b and the light-emitting device 34a and light-receiving device 34b are optically coupled via the optical interconnection lines 32. Further, the electrical interconnection lines 33 are arranged on the main surface of the flexible optoelectronic interconnection board 31 between one-end and the other end thereof.

The first electrical connection terminals 36a are provided on the main surface of the flexible optoelectronic interconnection board 31 on one-end side. The first electrical connection terminals 36a are arranged in a region of the circuit area 37a that is adjacent to the interconnection area 38. That is, the first electrical connection terminals 36a are arranged between the light-emitting device 34a and the interconnection area 38.

Portions of the first electrical connection terminals 36a are electrically connected to the light-emitting device 34a and other portions thereof are electrically connected to the electrical interconnection lines 33.

The first electrical connection terminals 36b are provided on the main surface of the flexible optoelectronic interconnection board 31 on the other end side. The first electrical connection terminals 36b are arranged in a region of the circuit area 37b that is adjacent to the interconnection area 38. That is, the first electrical connection terminals 36b are arranged between the light-receiving device 34b and the interconnection area 38. Portions of the first electrical connection terminals 36b are electrically connected to the light-receiving device 34b and the other portions thereof are electrically connected to the electrical interconnection lines 33. Thus, the portions of the electrical connection terminals 36a, 36b are electrically connected via the electrical interconnection lines 33.

In the above example, the light-emitting device 34a is provided on one-end side of the flexible optoelectronic interconnection board 31, the light-receiving device 34b is provided on the other end side thereof and the signal transmission direction is set to a single direction, but this invention is not limited to this case. For example, light-emitting devices 34a and light-receiving devices 34b may be respectively provided on both end sides of the interconnection board to permit bi-directional transmission.

Figure 3:
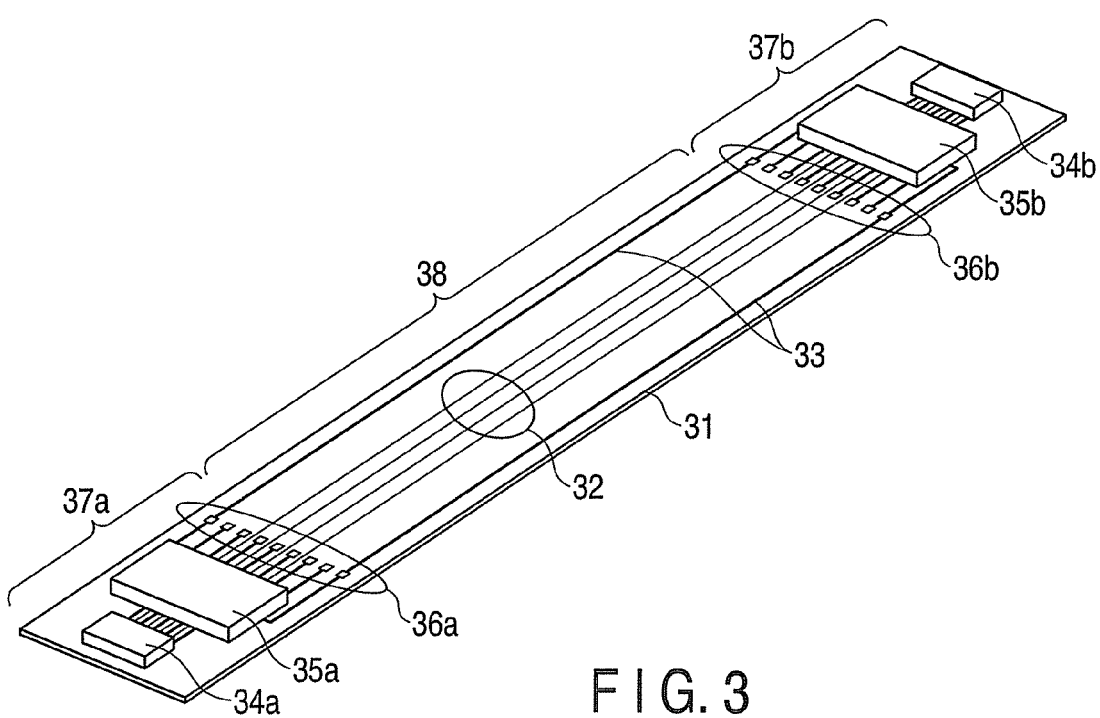
FIG. 3 is a perspective view showing another configuration example of the optoelectronic interconnection module used in the first embodiment.

As shown in FIG. 3, the optoelectronic interconnection module 30 may comprise driver ICs on the main surface of the flexible optoelectronic interconnection board 31 in addition to the configuration of FIG. 2. In FIG. 3, a first driver IC 35a that drives the light-emitting device 34a is provided between the light-emitting device 34a and the first electrical connection terminals 36a. Further, a second driver IC 35b that drives the light-receiving device 34b and amplifies an electrical signal input from the light-receiving device 34b is provided between the light-receiving device 34b and the first electrical connection terminals 36b. In this case, the circuit area 37a comprises a region on which the light-emitting device 34a and driver IC 35a are mounted and a region in which the first electrical connection terminals 36a are formed. Further, the circuit area 37b comprises a region on which the light-receiving device 34b and driver IC 35b are mounted and a region in which the first electrical connection terminals 36b are formed. The driver IC 35a may be provided between the light-emitting device 34a and one-end of the flexible optoelectronic interconnection board 31. Likewise, the driver IC 35b may be provided between the light-receiving device 34b and the other end of the flexible optoelectronic interconnection board 31.

However, if the interconnection distance from the first electrical connection terminals 36a to the first driver IC 35a and the interconnection distance from the first electrical connection terminals 36b to the second driver IC 35b become longer, a problem of an increase in signal delay, attenuation in signal amplitude and an increase in noise tends to occur. Therefore, it is preferable that the interconnection distance from the first electrical connection terminals 36a to the first driver IC 35a and the interconnection distance from the first electrical connection terminals 36b to the second driver IC 35b be made shorter. That is, it is desirable to provide the first driver IC 35a between the light-emitting device 34a and the first electrical connection terminals 36a and provide the second driver IC 35b between the light-receiving device 34b and the first electrical connection terminals 36b.

Figure 4:
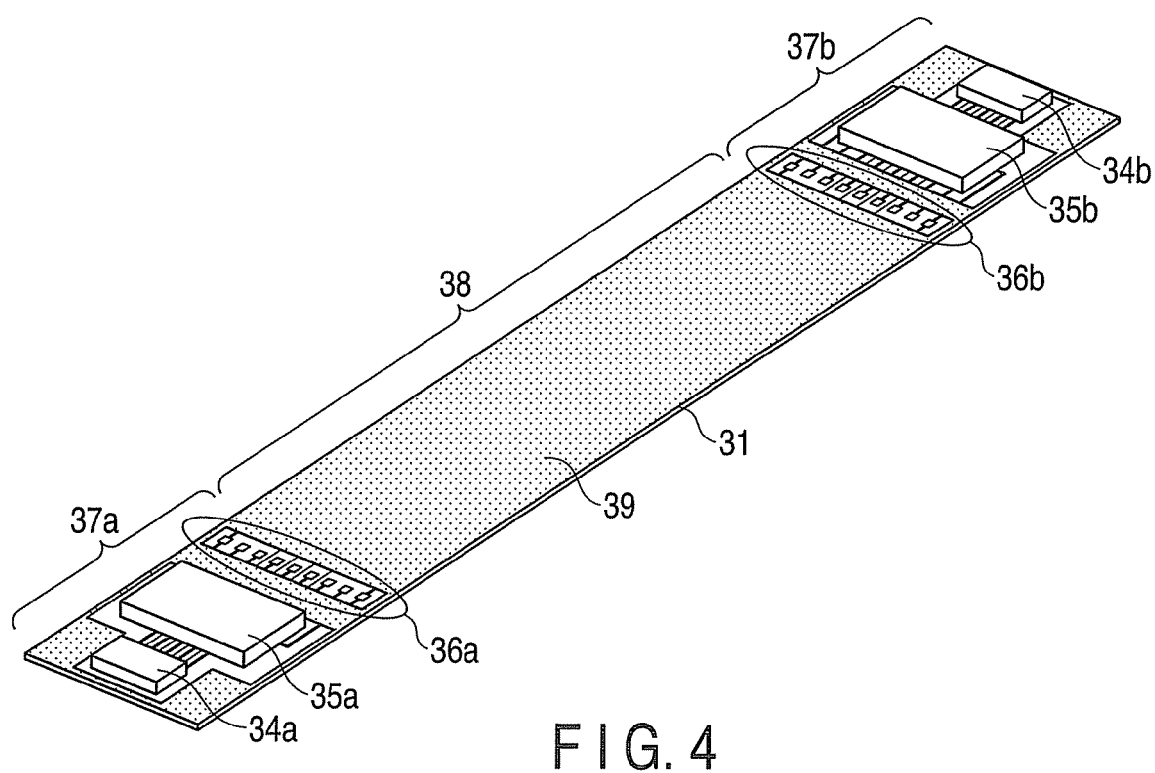
FIG. 4 is a perspective view showing still another configuration example of the optoelectronic interconnection module used in the first embodiment.

As shown in FIG. 4, a part of the main surface of the flexible optoelectronic interconnection board 31 may be covered with a protective layer formed of solder resist or a coverlay, for example. In FIG. 4, a part of the main surface of the flexible optoelectronic interconnection board 31 is covered with a protective layer 39 and regions on which the optical semiconductor devices 34 (34a, 34b) and driver ICs 35 (35a, 35b) are mounted and regions in which the first electrical connection terminals 36 (36a, 36b) are formed are exposed to the surface.

Figure 5:
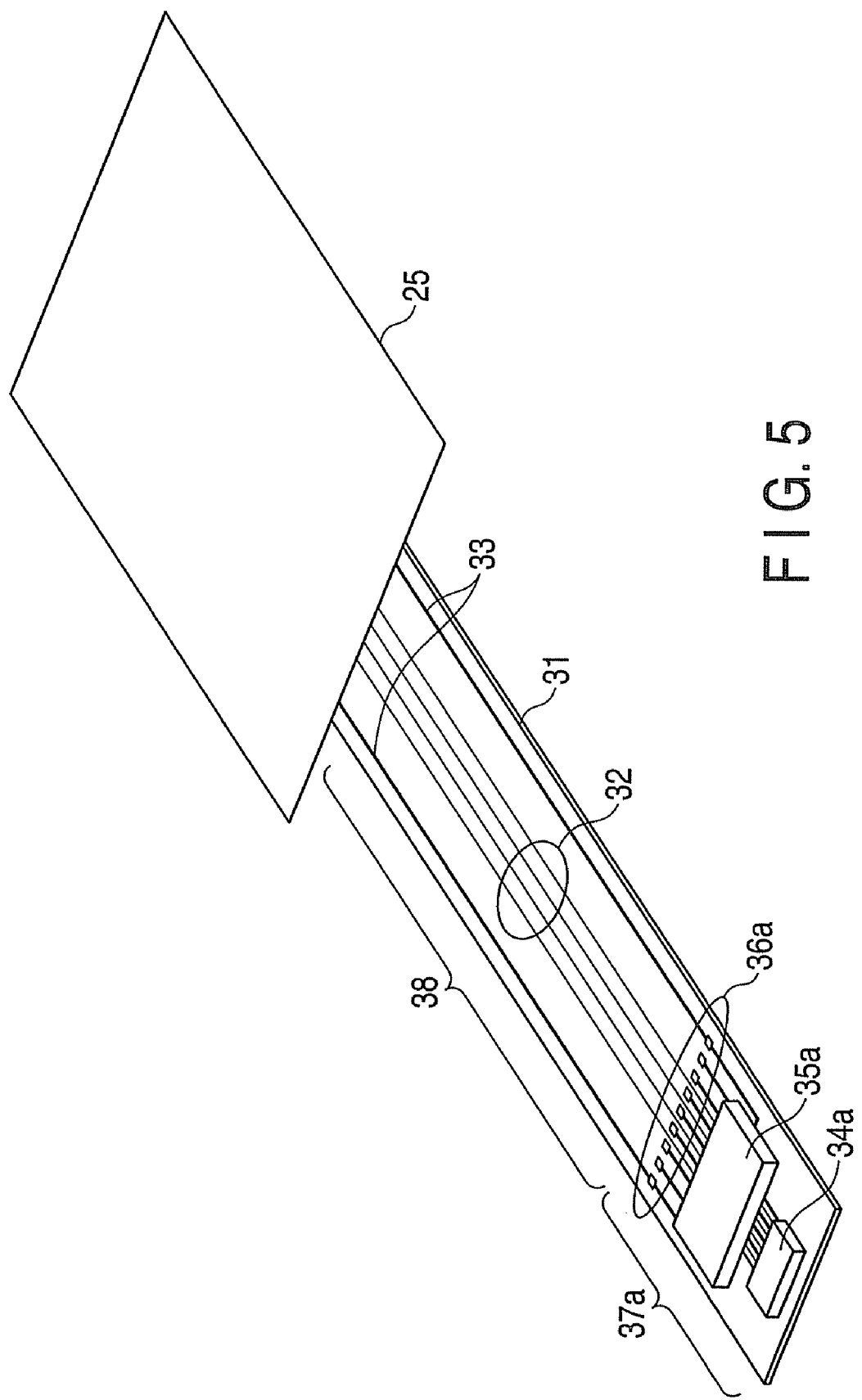
FIG. 5 is a perspective view showing another configuration example of the optoelectronic interconnection module used in the first embodiment.

FIG. 5 shows another configuration example of an optoelectronic interconnection module 30 and one-side ends or the other-side ends of the optical interconnection lines 32 and electrical interconnection lines 33 are directly connected to a module 25. As the module 25, for example, a display, camera or a substrate on which LSIs are mounted can be used.

Figure 6:
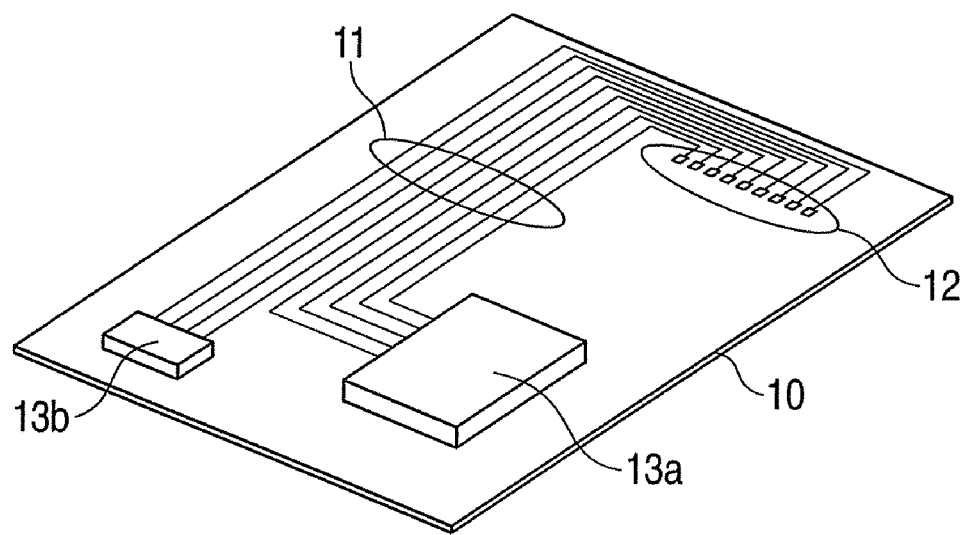
FIG. 6 is a perspective view showing a configuration example of a mounting board used in the first embodiment.

As shown in FIG. 6, the first mounting board 10 comprises electrical interconnection lines 11 and electrical connection terminals 12 on the main surface, and the electrical connection terminals 12 electrically connect the electrical interconnection lines 11 to the exterior. On the mounting board 10, LSIs (for example, CPU or memory) 13a, 13b electrically connected to the electrical interconnection lines 11 may be mounted. Further, instead of the LSIs 13a, 13b, for example, a module such as a display or camera may be connected or mounted. Although not shown in the drawing, the second mounting board 20 may be configured with the same structure as that of the first mounting board 10.

Figure 7:
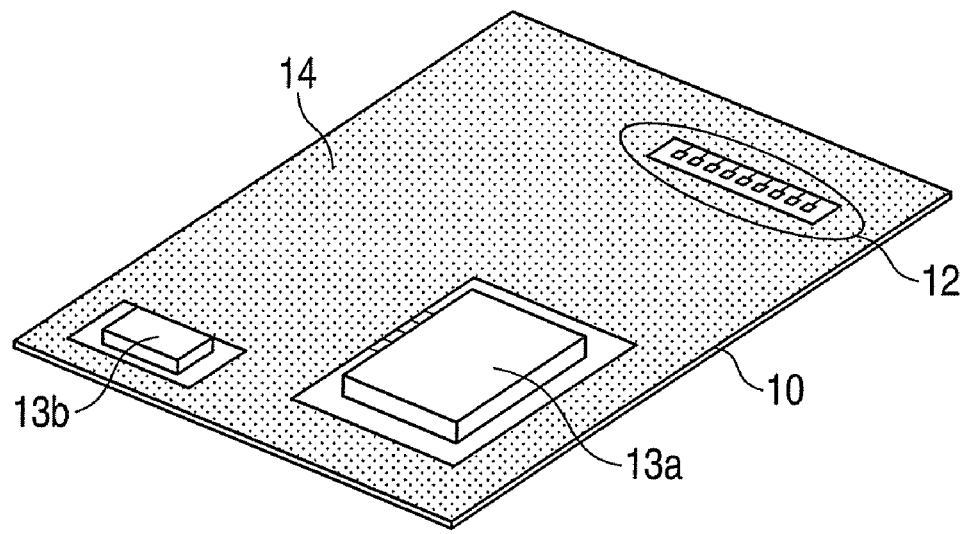
FIG. 7 is a perspective view showing another configuration example of the mounting board used in the first embodiment.

As shown in FIG. 7, a part of the main surface of each of the first and second mounting boards 10, 20 may be covered with a protective layer formed of solder resist, for example. In FIG. 7, a part of the main surface of the first mounting board 10 is covered with a protective layer 14 and regions on which the LSIs 13a, 13b are mounted and a region in which the electrical connection terminals 12 are formed are exposed to the surface.

Figure 8A:
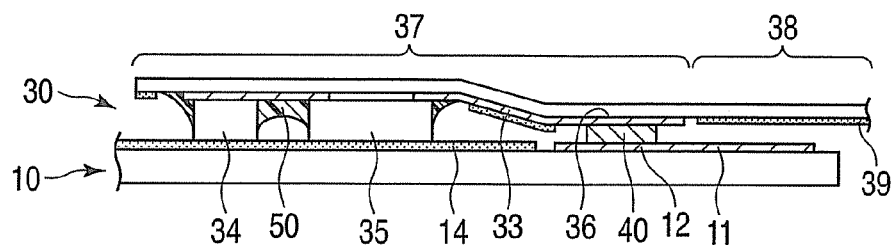
FIGS. 8A, 8B are a cross-sectional view and plan view showing the configuration of the main portion of the mounting structure according to the first embodiment.
Figure 8B:
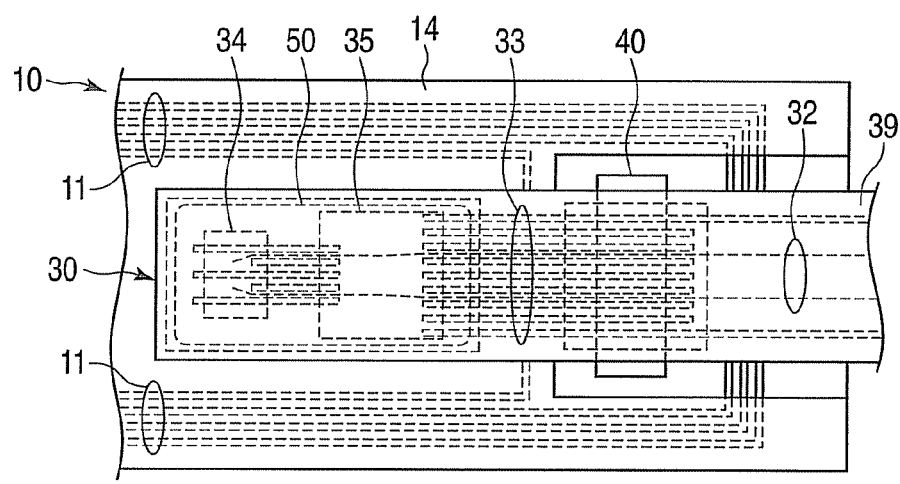

FIGS. 8A, 8B illustrate the configuration of the main portion of the mounting structure according to this embodiment, FIG. 8A being a cross-sectional view and FIG. 8B being a plan view. The drawing shows an example using the optoelectronic interconnection module of FIGS. 3 to 5 and shows a connecting portion on one-end side of the optoelectronic interconnection module 30. In FIGS. 8A, 8B, a reference symbol 50 denotes underfill resin (reinforcing member) provided on the bottom surfaces and side surfaces of the optical semiconductor device 34 and driver IC 35 to reinforce connecting portions between the optical semiconductor device 34 and driver IC 35 and the flexible optoelectronic interconnection board 31.

One-end side of the optoelectronic interconnection module 30 is mounted on the mounting board 10 with the main surface of the flexible optoelectronic interconnection board 31 set to face the main surface of the first mounting board 10. Although not shown in the drawing, the other end side of the optoelectronic interconnection module 30 may also be mounted or may not be mounted on the mounting board 20 with the main surface of the flexible optoelectronic interconnection board 31 set to face the main surface of the second mounting board 20. In the following description, only the connecting portion on one-end side of the optoelectronic interconnection module 30 is explained.

The first electrical connection terminals 36 of the optoelectronic interconnection module 30 and the electrical connection terminals 12 of the mounting board 10 are electrically connected, adhered and fixed by means of a conductive connection member 40. Further, the first electrical connection terminals 36 of the optoelectronic interconnection module 30 are disposed in a region lying in the circuit area 37 and arranged adjacent to the interconnection area 38. Therefore, even when the optoelectronic interconnection module 30 is used for internal wiring of a movable part (for example, a hinge unit of a mobile phone) to move the movable part, the front portion (a portion on which the optical semiconductor device 34 and driver IC 35 of the optoelectronic interconnection module 30 are mounted) that is set closer to the end of the circuit area 37 of the optoelectronic interconnection module 30 with respect to the first electrical connection terminals 36 is kept unmoved. As a result, it becomes possible to prevent the optical semiconductor device 34 and driver IC 35 from being brought into contact with the external structure and broken. Further, it becomes possible to prevent a portion on which the optical semiconductor device 34 and driver IC 35 of the optoelectronic interconnection module 30 are mounted from being bent and prevent the electrical connecting portion between the optical semiconductor device 34 and driver IC 35 and the electrical interconnection lines 33 from being broken.

Further, the optical semiconductor device 34 and driver IC 35 are mounted on the main surface of the flexible optoelectronic interconnection board 31 and disposed between the main surface of the flexible optoelectronic interconnection board 31 and the main surface of the mounting board 10. That is, the optical semiconductor device 34 and driver IC 35 are protected by means of the flexible optoelectronic interconnection board 31 and mounting board 10. Therefore, the optical semiconductor device 34 and driver IC 35 may be prevented from being brought into contact with the external structure in a product assembling step (for example, in a step of fixing the mounting structure on an external casing). Further, even if the interconnection area 38 of the optoelectronic interconnection module 30 is brought into contact with the external structure, the front portion (a portion on which the optical semiconductor device 34 and driver IC 35 of the optoelectronic interconnection module 30 are mounted) that is set closer to the end of the circuit area 37 with respect to the first electrical connection terminals 36 is kept unmoved. Therefore, it becomes possible to prevent the optical semiconductor device 34 and driver IC 35 from being broken and prevent the connecting portion with the electrical interconnection lines 33 from being destroyed.

The electrical connection and fixation between the first electrical connection terminals 36 of the optoelectronic interconnection module 30 and the electrical connection terminals 12 of the mounting board 10 can be attained by means of only the connection member 40. As a result, the connection can be attained at lower cost in comparison with a case wherein the first electrical connection terminals 36 of the optoelectronic interconnection module 30 are connected with the electrical connection terminals 12 of the mounting board 10 by use of connector parts or wire bonding and molding.

The connection member 40 forms a conductive path and cures by thermocompression bonding and, for example, an anisotropic conductive film (ACF) or anisotropic conductive paste (ACP) can be used. If the above material is used, the first electrical connection terminals 36 of the optoelectronic interconnection module 30 are heated and pressed against the electrical connection terminals 12 of the mounting board 10 after the electrical connection terminals 12, 36 are aligned with each other. As a result, only the opposing terminals can be connected and portions between the terminals can be adhered and fixed.

The connection member 40 may have an ultraviolet curing property. Further, the optoelectronic interconnection module 30 can be fixed on the mounting board 10 not only by means of the connection member 40 and but also by additionally using another mechanism (for example, fixation by means of screws, by using curing resin or by using a tape having sticky and adhesive properties).

During the above step (the thermocompression bonding step of the connection member 40), high pressure is applied to the upper and lower portions of the electrical connection terminals and the electrical connection terminals of the optoelectronic interconnection module 30 and mounting board 10. Therefore, as shown in the plan view of FIG. 8B, it is desirable to form the optical interconnection lines 32 of the optoelectronic interconnection module 30 in a portion other than the first electrical connection terminals 36 so as not to overlap the first electrical connection terminals 36. As a result, in the thermocompression bonding step, the optical interconnection lines 32 can be prevented from being damaged and light loss can be prevented from becoming worse.

Figure 9:
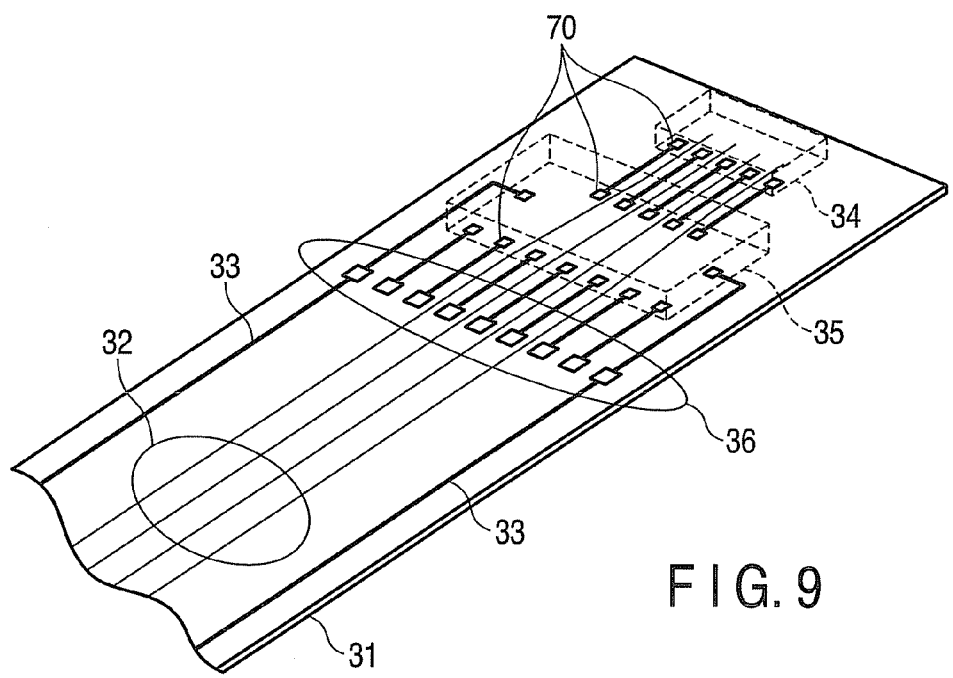
FIG. 9 is a perspective view showing the configuration of the main portion of the mounting board according to the first embodiment.

Likewise, as shown in the perspective view of FIG. 9, it is desirable to form the optical interconnection lines 32 in a location other than electrical connecting portions between the electrical interconnection lines 33 and the optical semiconductor device 34 and driver IC 35. For example, when the electrical connection between the electrical interconnection lines 33 and the optical semiconductor device 34 and driver IC 35 is realized by means of an ultrasonic flip chip bonding process, high pressure and ultrasonic waves are applied to the electrical interconnection lines 33 that lie directly under electrical connection terminals (for example, gold bumps) 70 formed on the optical semiconductor device 34 and driver IC 35. Further, for example, when the electrical connection between the optical semiconductor device 34 and driver IC 35 and the electrical interconnection lines 33 is realized by means of wire bonding, high pressure and ultrasonic waves are applied to the electrical interconnection lines 33 that lie directly under wires. By forming the optical interconnection lines 32 in a location other than electrical connecting portions between the electrical interconnection lines 33 and the optical semiconductor device 34 and driver IC 35, the optical interconnection lines 32 can be prevented from being damaged and light loss can be prevented from becoming worse in the above step (ultrasonic flip chip bonding process or wire bonding process).

As shown in FIG. 8A, a bending portion is provided near the end portion (between the driver IC 35 and the first electrical connection terminals 36) of the flexible optoelectronic interconnection board 31. By the presence of the bending portion, a portion in which the electrical connection terminals 36 are provided can be arranged closer to the mounting board 10 than the mounting portion of the optical semiconductor device 34 and driver IC 35. As a result, the connection member 40 can be made thin and connection can be attained by means of the connection member 40 of low cost. Instead of providing the bending portion, a connection member with substantially the same thickness as that of the optical semiconductor device 34 and driver IC 35 can be used or the thickness of the optical semiconductor device 34 and driver IC 35 can be reduced to substantially the same thickness of the connection member.

As described above, according to this embodiment, the optoelectronic interconnection module 30 having the optical semiconductor device 34 and driver IC 35 mounted on the main surface of the flexible optoelectronic interconnection board 31 is mounted on the mounting board 10 with the main surface of the flexible optoelectronic interconnection board 31 set to face the main surface of the mounting board 10. Further, the first electrical connection terminals 36 of the optoelectronic interconnection module 30 formed in the region adjacent to the interconnection area 38 of the optoelectronic interconnection module 30 are connected to the electrical connection terminals 12 of the mounting board 10 via the connection member 40. As a result, a load structurally imposed on the optical semiconductor device 34 and driver IC 35 of the optoelectronic interconnection module 30 can be alleviated and the reliability thereof can be enhanced. Therefore, the mounting structure of low cost and high reliability having the optoelectronic interconnection module mounted on the mounting board can be realized and the cost of information communication devices can be further reduced and the performance thereof can be increasingly enhanced.

Second Embodiment

Figure 10A:
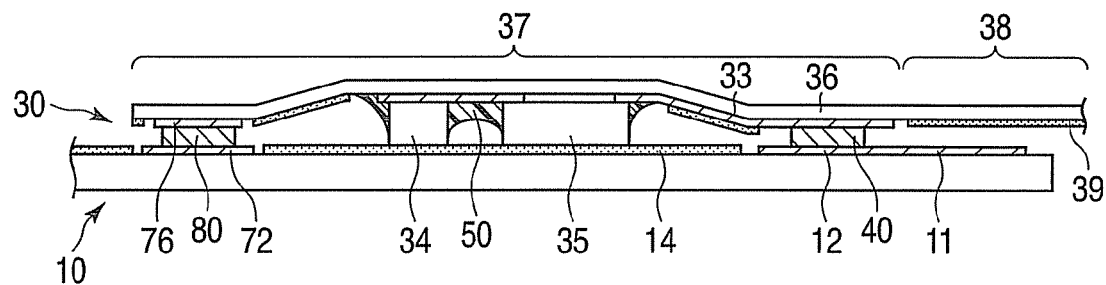
FIGS. 10A, 10B are a cross-sectional view and plan view showing the configuration of the main portion of a mounting structure according to a second embodiment.
Figure 10B:
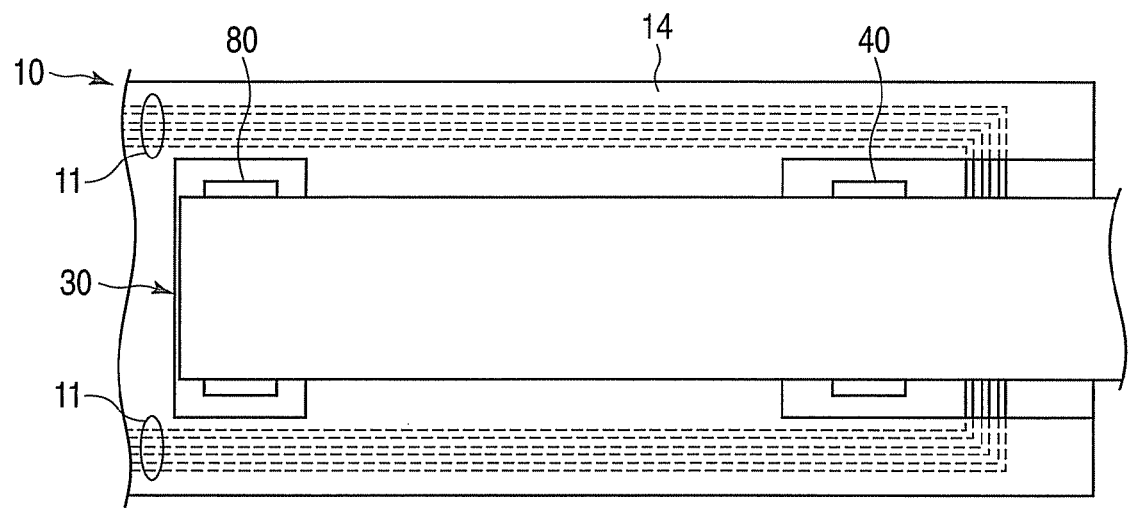

FIGS. 10A, 10B illustrate the configuration of the main portion of a mounting structure according to a second embodiment of this invention, FIG. 10A being a cross-sectional view and FIG. 10B being a plan view. The same portions as those of FIGS. 8A, 8B are denoted by the same reference symbols and detailed explanation thereof is omitted.

In FIGS. 10A, 10B, second electrical connection terminals 76 are formed on the main surface of a flexible optoelectronic interconnection board 31 on the opposite side (between an optical semiconductor device 34 and the end portion of an optoelectronic interconnection module 30) of first electrical connection terminals 36 with respect to an optical semiconductor device 34 and driver IC 35 in a circuit portion 37. Further, electrical connection terminals 12 are formed directly below the first electrical connection terminals 36 of the optoelectronic interconnection module 30 on the main surface of the mounting board 10 and electrical connection terminals 72 are formed directly below the second electrical connection terminals 76. The second electrical connection terminals 76 of the optoelectronic interconnection module 30 and the electrical connection terminals 72 of the mounting board 10 are electrically connected, adhered and fixed by means of a connection member 80. As the connection member 80, the same material as the connection member 40 may be used and the connection members 40, 80 may be simultaneously bonded by thermocompression. Further, the cost for the connection members can be suppressed by using the separate connection members 40, 80 for the first electrical connection terminals 36 and second electrical connection terminals 76.

With the above configuration, a portion on which the optical semiconductor device 34 and driver IC 35 of the circuit portion 37 of the optoelectronic interconnection module 30 are mounted can be more stably fixed than in a case of the first embodiment. As a result, a load structurally imposed on the optical semiconductor device 34 and driver IC 35 of the optoelectronic interconnection module 30 can be alleviated.

Third Embodiment

Figure 11A:
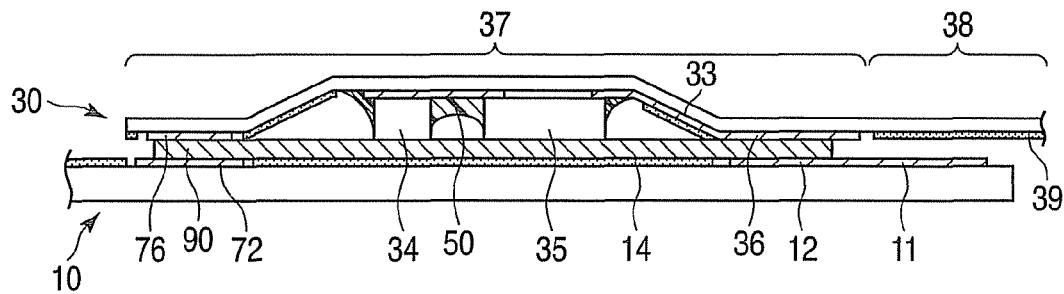
FIGS. 11A, 11B are a cross-sectional view and plan view showing the configuration of the main portion of a mounting structure according to a third embodiment.
Figure 11B:
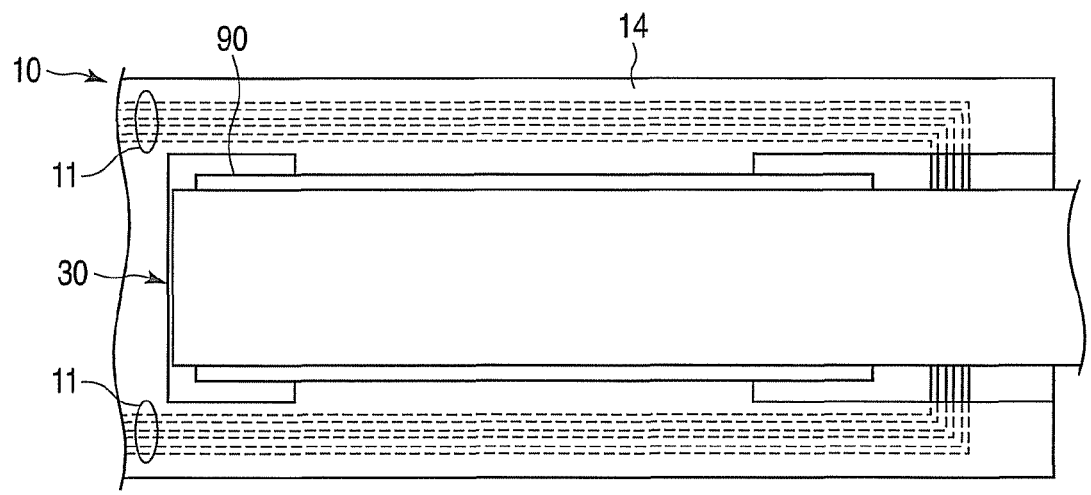

FIGS. 11A, 11B illustrate the configuration of the main portion of a mounting structure according to a third embodiment of this invention, FIG. 11A being a cross-sectional view and FIG. 11B being a plan view. The same portions as those of FIGS. 10A, 10B are denoted by the same reference symbols and detailed explanation thereof is omitted.

This embodiment is similar to the second embodiment except that one connection member 90 is used instead of the connection members 40, 80. That is, the connection member 90 extending from the first electrical connection terminals 36 to the second electrical connection terminals 76 is arranged between the optoelectronic interconnection module 30 and the mounting board 10. The first and second electrical connection terminals 36, 76 are electrically connected to electrical connection terminals 12, 72, respectively, by means of the connection member 90.

With the above configuration, the number of parts used can be reduced and the cost for the process can be reduced. Further, since the optical semiconductor device 34 and driver IC 35 can be fixed on the main surface of the mounting board 10, a portion on which the optical semiconductor device 34 and driver IC 35 of the circuit portion 37 are mounted can be more stably fixed. In addition, heat generated from the optical semiconductor device 34 and driver IC 35 can be efficiently radiated to the mounting board 10 via the connection member 90 and the performance of the optoelectronic interconnection module 30 can be enhanced.

An island-form metal region having larger size than that of the optical semiconductor device 34 and driver IC 35 may be formed on the main surface of the mounting board 10 that lies directly below the optical semiconductor device 34 and driver IC 35 and it may be connected to a ground line via an interconnection line and via, for example. As a result, the efficiency of heat release from the optical semiconductor device 34 and driver IC 35 to the mounting board 10 can be further enhanced.

Fourth Embodiment

Figure 12A:
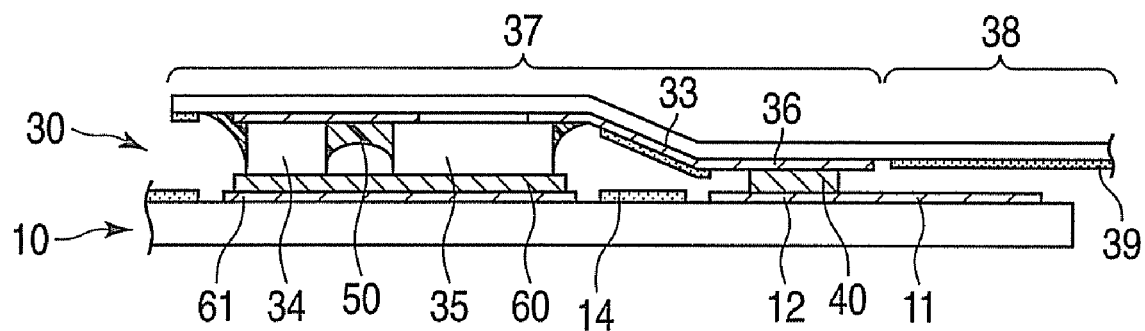
FIGS. 12A, 12B are a cross-sectional view and plan view showing the configuration of the main portion of a mounting structure according to a fourth embodiment.
Figure 12B:
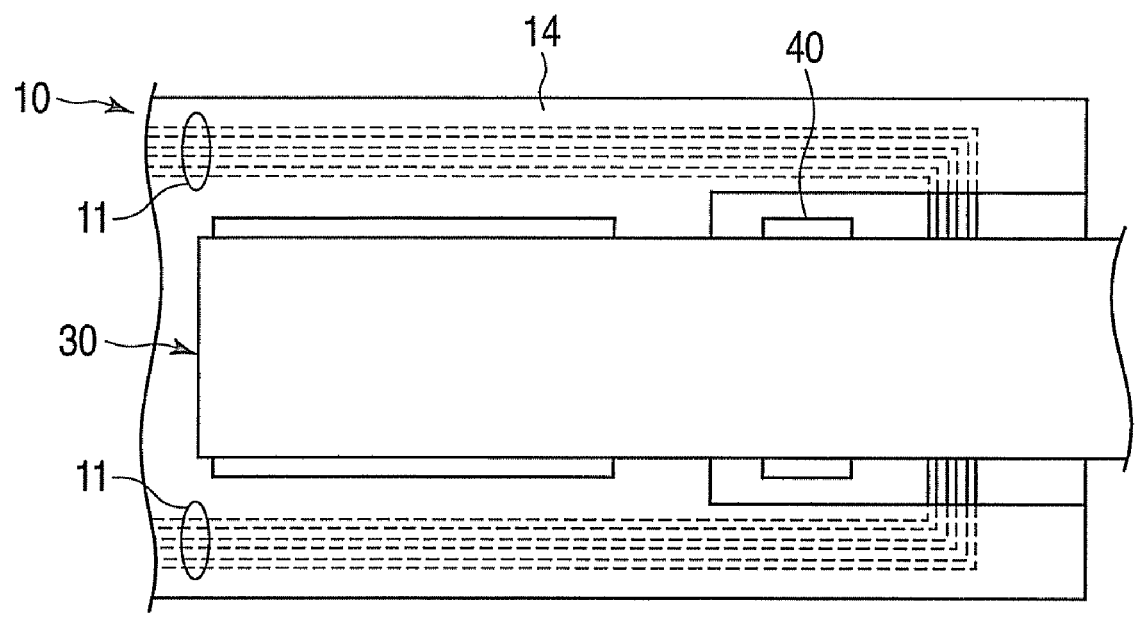

FIGS. 12A, 12B illustrate the configuration of the main portion of a mounting structure according to a fourth embodiment of this invention, FIG. 12A being a cross-sectional view and FIG. 12B being a plan view. The same portions as those of FIGS. 8A, 8B are denoted by the same reference symbols and detailed explanation thereof is omitted.

This embodiment is similar to the case of FIGS. 8A, 8B except that the surfaces of the optical semiconductor device 34 and driver IC 35 of the optoelectronic interconnection module 30 make contact with the main surface of the mounting board 10 with a thermally-conductive member 60 disposed therebetween. As a result, efficient heat release from the optical semiconductor device 34 and driver IC 35 of the optoelectronic interconnection module 30 to the mounting board 10 can be attained. Further, an island-form metal region 61 having larger size than that of the optical semiconductor device 34 and driver IC 35 may be formed on the main surface of the mounting board 10 that lies directly below the optical semiconductor device 34 and driver IC 35 and it may be connected to a ground line via an interconnection line and via, for example. As a result, the efficiency of heat release from the optical semiconductor device 34 and driver IC 35 to the mounting board 10 can be further enhanced.

The thermally-conductive member 60 is desired to have thermal conductivity higher than average thermal conductivity of a flexible optoelectronic interconnection board 31 and, for example, a thermally-conductive sheet or thermally-conductive grease formed of silicone resin or graphite can be used. Further, the thermally-conductive member 60 may have stickiness, thermosetting property or ultraviolet curing property. As a result, the optical semiconductor device 34 and driver IC 35 can be fixed on the main surface of the mounting board 10 and a load structurally imposed on the optical semiconductor device 34 and driver IC 35 can be alleviated.

As the thermally-conductive member 60, the connection member 40 can be used. In this case, different connection members can be used directly under the first electrical connection terminals 36 of the optoelectronic interconnection module 30 and directly under the optical semiconductor device 34 and driver IC 35, or a connection member that is continuously formed from directly under the first electrical connection terminals 36 to directly under the optical semiconductor device 34 and driver IC 35 may be used.

Fifth Embodiment

FIGS. 13A, 13B illustrate the configuration of the main portion of a mounting structure according to a fifth embodiment of this invention, FIG. 13A being a cross-sectional view and FIG. 13B being a plan view. The same portions as those of FIGS. 8A, 8B are denoted by the same reference symbols and detailed explanation thereof is omitted.

In this embodiment, a concave portion 15 in which an optical semiconductor device, driver IC and the like are received is formed in the mounting board 10. That is, the concave portion 15 slightly larger than the optical semiconductor device 34 and driver IC 35 is formed on the main surface of the mounting board 10 at a position facing the optical semiconductor device 34 and driver IC 35. With the above configuration, the bending portion of the flexible optoelectronic interconnection board 31 becomes unnecessary and stress applied to the flexible optoelectronic interconnection board 31 can be alleviated. Therefore, the reliability of the optoelectronic interconnection module 30 and mounting structure can be enhanced.

A thermally-conductive member of thermally-conductive grease or thermally-conductive sheet may be disposed on the bottom surface of the concave portion 15. Further, the concave portion 15 is desirable to have a width greater than the width (vertically in FIG. 13B) of the flexible optoelectronic interconnection board 31. If the width of the concave portion 15 is greater than the width of the flexible optoelectronic interconnection board 31 and when a thermally-conductive member is disposed on the bottom surface of the concave portion 15, heat release from the thermally-conductive member into air can be attained. Further, after the optical semiconductor device 34 and driver IC 35 are received in the concave portion 15, a thermally-conductive member can be filled therein from apertures of the concave portion 15 besides the flexible optoelectronic interconnection board 31.

Sixth Embodiment

Figure 14A:
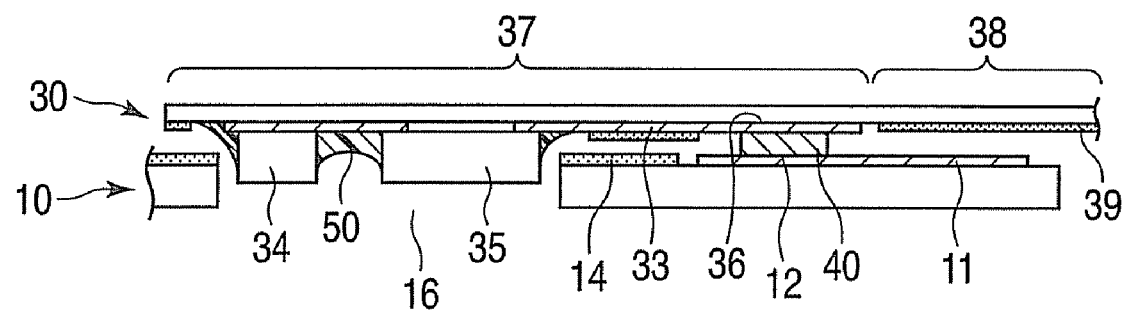
FIGS. 14A, 14B are a cross-sectional view and plan view showing the configuration of the main portion of a mounting structure according to a sixth embodiment.
Figure 14B:
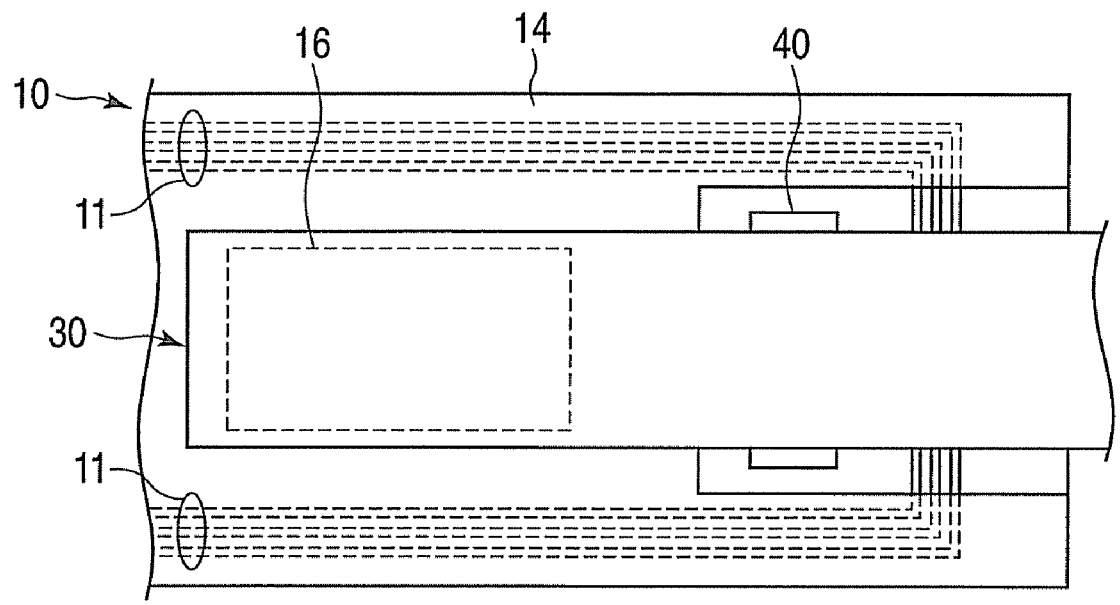

FIGS. 14A, 14B illustrate the configuration of the main portion of a mounting structure according to a sixth embodiment of this invention, FIG. 14A being a cross-sectional view and FIG. 14B being a plan view. The same portions as those of FIGS. 8A, 8B are denoted by the same reference symbols and detailed explanation thereof is omitted.

In this embodiment, a through-hole 16 in which an optical semiconductor device, driver IC and the like are received is formed in the mounting board 10. That is, the through-hole 16 that is slightly larger than the optical semiconductor device 34 and driver IC 35 is formed at a position facing the optical semiconductor device 34 and driver IC 35 on the main surface of the mounting board 10. With the above configuration, the bending portion of the flexible optoelectronic interconnection board 31 becomes unnecessary and stress applied to the flexible optoelectronic interconnection board 31 can be alleviated. Therefore, the reliability of the optoelectronic interconnection module 30 and mounting structure can be enhanced.

A thermally-conductive member may be filled in the through-hole 16. Further, the through-hole 16 desirably has a width (vertically in FIG. 14B) less than the width of the flexible optoelectronic interconnection board 31. If the through-hole is formed as described above, a thermally-conductive member (for example, thermally-conductive grease) having fluidity can be injected from the back surface (lower side in FIG. 14A) of the through-hole 16 of the mounting board 10 without causing a leakage to the front surface side (main surface side of the mounting board 10) of the through-hole 16.

As a method for fixing the circuit portion 37 of the optoelectronic interconnection module 30, a method for attaching an adhesive tape from the back surface of the flexible optoelectronic interconnection board of the circuit portion 37 to fix the same on the main surface of the mounting board 10, a method for coating thermosetting resin or ultraviolet curing resin on a region that covers the back surface of the circuit portion 37 and the main surface of the mounting board 10 to fix the same or a method using a mechanical clamping mechanism may be used.

(Modification)

Figure 15:
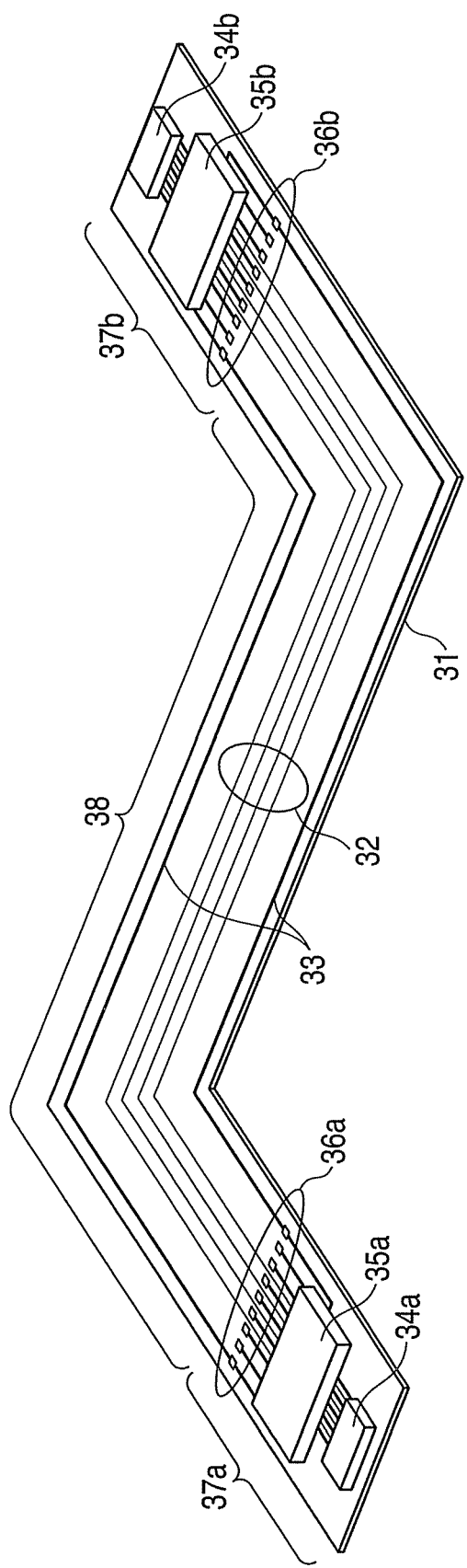
FIG. 15 is a perspective view showing a configuration example of an optoelectronic interconnection module according to a modification.
Figure 16:
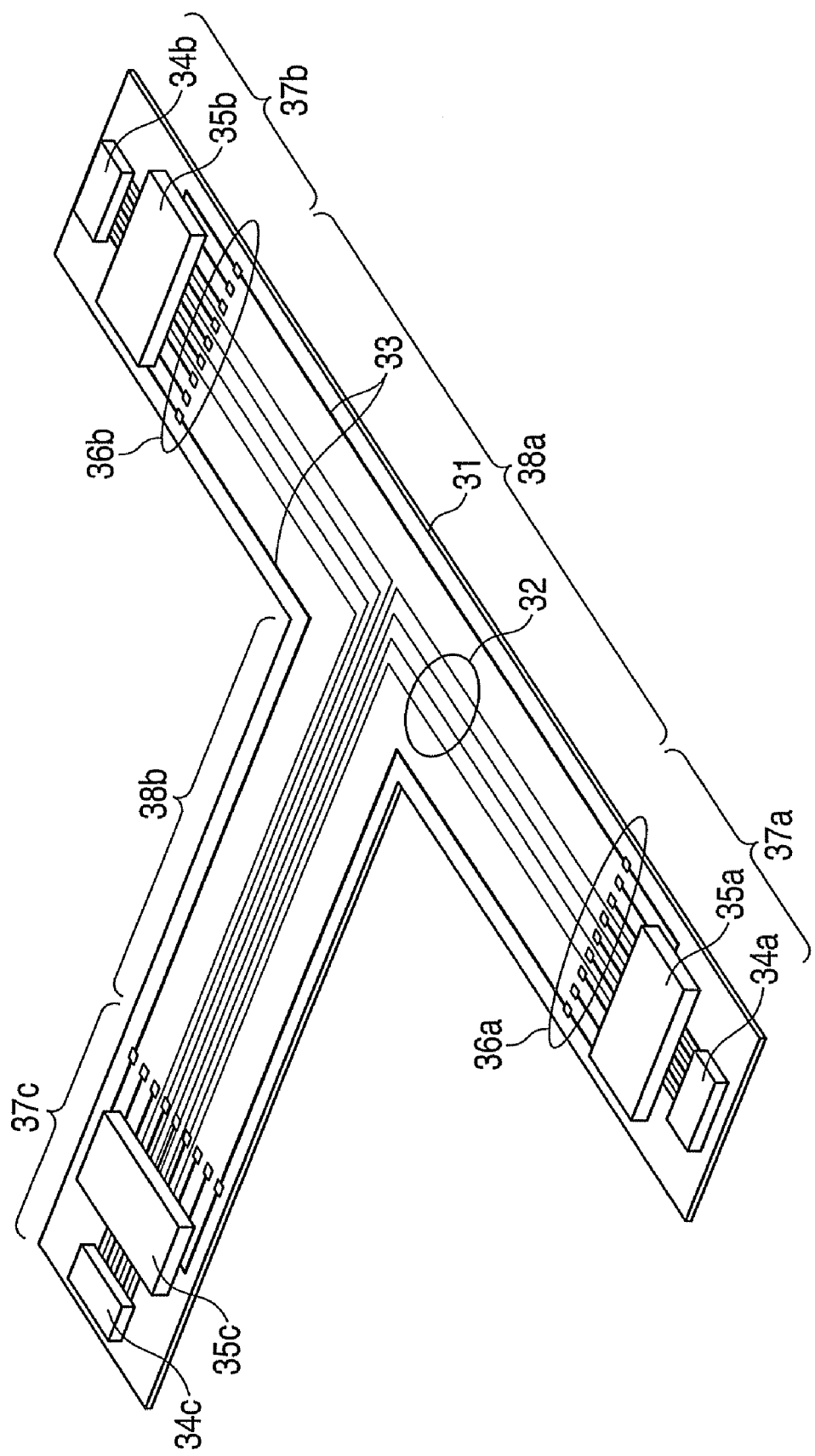
FIG. 16 is a perspective view showing a configuration example of an optoelectronic interconnection module according to a modification.

This invention is not limited to the above embodiments. In the above embodiments, a linear optoelectronic interconnection module is used as the optoelectronic interconnection module, but a curved module or a module with a combination of linear and curved forms can be used. As shown in FIG. 15, a module with a combination of lines extending in different directions can be used. In the embodiments described so far, the optoelectronic interconnection module having circuit portions provided at one-end and at the other end is used. However, unlike the above case, as shown in FIG. 16, a flexible optoelectronic interconnection board comprising a branch and a different circuit portion provided at the end of the branch can be used. In addition, the board may comprise a different circuit portion between one-end and the other end in addition to the circuit portions provided at one-end and at the other end even if a branch is not provided.

The thermally-conductive member is not limited to the thermally-conductive sheet or thermally-conductive grease and can be adequately modified according to the specification. Likewise, the connection member is not limited to ACF or ACP and can be adequately modified according to the specification. The optoelectronic interconnection module may have a stiffening plate which has higher rigidity than that of the flexible optoelectronic interconnection board on the back surface of the circuit area on which the optical semiconductor device and driver IC are mounted. The mounting structure is not limited to the structure obtained by connecting the two mounting boards by means of the optoelectronic interconnection module and may be a structure obtained by connecting the optoelectronic interconnection module shown in FIG. 5 to one mounting board.

As the light-emitting device that is the optical semiconductor device, various types of light-emitting devices such as light-emitting diodes or semiconductor lasers can be used. As the light-receiving device that is the optical semiconductor device, various types of light-receiving devices such as PIN photodiodes, MSM photodiodes, avalanche photodiodes or photoconductors can be used. The driver IC can be formed by using various processes, such as a CMOS or BiCMOS process, and it may be an IC having only a driver circuit mounted thereon or an IC having various circuit functions in addition to the driver circuit mounted thereon. The optoelectronic interconnection module may have electronic parts such as chip resistors, chip capacitors and the like mounted thereon in addition to the optical semiconductor device and driver IC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mounting structure comprising:
an optoelectronic interconnection module comprising a flexible optoelectronic interconnection board, electrical interconnection lines formed on a main surface of the flexible optoelectronic interconnection board, optical interconnection lines formed on the flexible optoelectronic interconnection board, an optical semiconductor device directly mounted on the main surface of the flexible optoelectronic interconnection board and optically coupled with the optical interconnection lines, and first electrical connection terminals for the module that are formed on the main surface of the flexible optoelectronic interconnection board to electrically connect the electrical interconnection lines to an exterior; the optoelectronic interconnection module comprising a circuit area that includes a region on which the optical semiconductor device is mounted and a region in which the first electrical connection terminals for the module are formed, and an interconnection area that includes a region which is an area other than the circuit area and in which the optical interconnection lines and electrical interconnection lines are formed; the first electrical connection terminals for the module being formed on the interconnection area side rather than the optical semiconductor device;
a mounting board comprising electrical interconnection lines and electrical connection terminals for the mounting board that electrically connect the electrical interconnection lines to the exterior on a main surface, the optoelectronic interconnection module being mounted thereon with the main surface of the flexible optoelectronic interconnection board set to face the main surface thereof; and
a conductive connection member provided between the first electrical connection terminals for the module and the electrical connection terminals for the mounting board to electrically connect, adhere and fix the respective electrical connection terminals.

2. The structure of claim 1, wherein the optoelectronic interconnection module further comprises second electrical connection terminals for the module formed on the main surface of the flexible optoelectronic interconnection board on an opposite side of the first electrical connection terminals for the module with respect to the optical semiconductor device, and is connected to the electrical connection terminals for the mounting board at two portions of the first electrical connection terminals for the module and the second electrical connection terminals for the module by means of the connection member.

3. The structure of claim 2, wherein the connection member comprises connection members separately arranged for the first electrical connection terminals for the module and the second electrical connection terminals for the module.

4. The structure of claim 2, wherein the connection member is continuously formed from the first electrical connection terminals for the module to the second electrical connection terminals for the module.

5. The structure of claim 1, wherein the connection member is one of an anisotropic conductive film and anisotropic conductive paste that forms a conductive path and cures by thermocompression bonding.

6. The structure of claim 1, wherein the optical interconnection lines of the optoelectronic interconnection module are formed to avoid the first electrical connection terminals for the module.

7. The structure of claim 1, wherein the flexible optoelectronic interconnection board comprises a bending portion that causes a portion in which the first electrical connection terminals for the module are provided to be set closer to the mounting board rather than a portion on which the optical semiconductor device is mounted.

8. The structure of claim 1, wherein one of a concave portion and through-hole having an area greater than an area of the optical semiconductor device on the mounting board side is formed in the main surface of the mounting board.

9. The structure of claim 1, further comprising a thermally-conductive member that is provided between the optical semiconductor device and the mounting board and releases heat of the optical semiconductor device to the mounting board side.

10. A mounting structure comprising:
an optoelectronic interconnection module comprising a flexible optoelectronic interconnection board, electrical interconnection lines formed on a main surface of the flexible optoelectronic interconnection board, optical interconnection lines formed on the flexible optoelectronic interconnection board, an optical semiconductor device directly mounted on the main surface of the flexible optoelectronic interconnection board and optically coupled with the optical interconnection lines, a driver IC that is mounted on the main surface of the flexible optoelectronic interconnection board and drives the optical semiconductor device, and first electrical connection terminals for the module that are formed on the main surface of the flexible optoelectronic interconnection board to electrically connect the electrical interconnection lines to an exterior; the optoelectronic interconnection module comprising a circuit area that includes a region on which the optical semiconductor device and driver IC are mounted and a region in which the first electrical connection terminals for the module are formed, and an interconnection area that comprises a region which is an area other than the circuit area and in which the optical interconnection lines and electrical interconnection lines are formed; the first electrical connection terminals for the module being formed on the interconnection area side rather than the optical semiconductor device and driver IC;
a mounting board comprising electrical interconnection lines and electrical connection terminals for the mounting board that electrically connect the electrical interconnection lines to the exterior on a main surface, the optoelectronic interconnection module being mounted thereon with the main surface of the flexible optoelectronic interconnection board set to face the main surface thereof; and
a conductive connection member provided between the first electrical connection terminals for the module and the electrical connection terminals for the mounting board to electrically connect, adhere and fix the respective electrical connection terminals.

11. The structure of claim 10, wherein the optoelectronic interconnection module further comprises second electrical connection terminals for the module formed on the main surface of the flexible optoelectronic interconnection board on an opposite of the first electrical connection terminals for the module with respect to the optical semiconductor device and driver IC, and is connected to the electrical connection terminals for the mounting board at two portions of the first electrical connection terminals for the module and the second electrical connection terminals for the module by means of the connection member.

12. The structure of claim 11, wherein the connection member comprises connection members separately arranged for the first electrical connection terminals for the module and the second electrical connection terminals for the module.

13. The structure of claim 11, wherein the connection member is continuously formed from the first electrical connection terminals for the module to the second electrical connection terminals for the module.

14. The structure of claim 10, wherein the connection member is one of an anisotropic conductive film and anisotropic conductive paste that forms a conductive path and cures by thermocompression bonding.

15. The structure of claim 10, wherein the optical interconnection lines of the optoelectronic interconnection module are formed to avoid the first electrical connection terminals for the module.

16. The structure of claim 10, wherein the driver IC of the optoelectronic interconnection module is mounted between the optical semiconductor device and the first electrical connection terminals for the module.

17. The structure of claim 10, wherein the flexible optoelectronic interconnection board comprises a bending portion that causes a portion in which the first electrical connection terminals for the module are provided to be set closer to the mounting board rather than a portion on which the optical semiconductor device and driver IC are mounted.

18. The structure of claim 10, wherein one of a concave portion and through-hole having an area greater than an area of the optical semiconductor device and driver IC on the mounting board side is formed in the main surface of the mounting board.

19. The structure of claim 10, further comprising a thermally-conductive member that is provided between at least one of the driver IC and optical semiconductor device and the mounting board and releases heat of at least one of the driver IC and optical semiconductor device to the mounting board side.

* * * * *